(12) United States Patent
Nagano et al.

(10) Patent No.: US 7,269,890 B2
(45) Date of Patent: Sep. 18, 2007

(54) SLOTLESS ROTARY ELECTRIC MACHINE AND MANUFACTURING METHOD OF COILS FOR SUCH A MACHINE

(75) Inventors: Masao Nagano, Wako (JP); Masaru Ozawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 231 days.

(21) Appl. No.: 10/517,141

(22) PCT Filed: Jul. 18, 2003

(86) PCT No.: PCT/JP03/09170

§ 371 (c)(1),
(2), (4) Date: Dec. 7, 2004

(87) PCT Pub. No.: WO2004/045048

PCT Pub. Date: May 27, 2004

(65) Prior Publication Data

US 2005/0225197 A1    Oct. 13, 2005

(30) Foreign Application Priority Data

Nov. 13, 2002    (JP) ............................. 2002-328951

(51) Int. Cl.
*H02K 15/04*    (2006.01)

(52) U.S. Cl. ............................ 29/605; 29/596; 242/536; 242/602; 310/179; 310/184

(58) Field of Classification Search .................. 29/596, 29/598, 605, 606, 732, 868; 242/536, 602, 242/602.1, 437.4, 447.3, 157 R, 484.4, 615, 242/361.2; 310/179, 184, 195, 254
See application file for complete search history.

(56) References Cited

U.S. PATENT DOCUMENTS 1,653,784 A * 12/1927 Roebel ...................... 310/213

(Continued)

FOREIGN PATENT DOCUMENTS

EP    0 251 029 A1    1/1988

(Continued)

OTHER PUBLICATIONS

Machine Translation of FR2411788.*

(Continued)

*Primary Examiner*—Peter Vo
*Assistant Examiner*—Livius R. Cazan
(74) *Attorney, Agent, or Firm*—Squire, Sanders & Dempsey, LLP

(57) ABSTRACT

In a slotless permanent magnet rotary electric machinery, comprising a substantially cylindrical rotor (53) incorporated with a permanent magnet (52), a stator iron core (54) surrounding the rotor; and a coil (55) provided between the rotor (53) and stator core (54) in a spaced relationship with respect to the rotor (53), the coil (55) comprises a plurality of turns which are shifted from one turn to another along the circumferential direction in a mutually overlapping manner; and the coil turns are formed by a conductor (60, 60a, 60b) having an elongated cross section, a long axis of the cross section extending in a radial direction. This provides rotary electric machinery which can significantly reduce loss in a high speed range without substantially increasing copper loss.

5 Claims, 17 Drawing Sheets

U.S. PATENT DOCUMENTS

| | | | | |
|---|---|---|---|---|
| 2,638,278 A * | 5/1953 | Scott | ............... | 242/437.4 |
| 2,755,036 A * | 7/1956 | Terho | ............... | 242/602.1 |
| 3,102,161 A * | 8/1963 | Raisebeck | ............ | 174/127 |
| 3,831,267 A | 8/1974 | Onishi et al. | ............ | 29/598 |
| 3,946,349 A * | 3/1976 | Haldeman, III | ............ | 336/62 |
| 4,481,438 A * | 11/1984 | Keim | ............... | 310/201 |
| 4,543,708 A * | 10/1985 | Matsubara et al. | ...... | 29/598 |
| 6,727,625 B2 * | 4/2004 | Ooiwa | ............... | 310/184 |
| 6,798,105 B1 * | 9/2004 | Nilson | ............ | 310/179 |
| 2004/0046474 A1 * | 3/2004 | Kalsi | ............... | 310/179 |

FOREIGN PATENT DOCUMENTS

| | | |
|---|---|---|
| EP | 1 073 179 A2 | 1/2001 |
| EP | 1073179 A2 * | 1/2001 |
| FR | 2 411 788 | 7/1979 |
| FR | 2411788 A * | 8/1979 |
| JP | 60-234438 | 11/1985 |
| JP | 03-135344 | 6/1991 |
| JP | 2000-215972 | 8/2000 |
| JP | 2001-037130 | 2/2001 |
| JP | 2002-203438 | 7/2002 |
| JP | 2002-247791 | 8/2002 |
| JP | 2002-272049 | 9/2002 |
| JP | 2002-325406 | 11/2002 |
| SU | 1304129 A * | 4/1987 |

OTHER PUBLICATIONS

Japanese Industrial Standard, "Rectangular Copper Wires for Electrical Purposes", Jul. 1, 1994 (with its English translation).

* cited by examiner

Prior Art

Prior Art

Prior Art

SLOTLESS ROTARY ELECTRIC MACHINE AND MANUFACTURING METHOD OF COILS FOR SUCH A MACHINE

TECHNICAL FIELD

The present invention relates to a slotless permanent magnet rotary electric machinery and a method of making coils for such machinery.

BACKGROUND OF THE INVENTION

Conventionally, rotary machinery in such forms as electric generators and electric motors is sometimes constructed as a slotless type having no slot for receiving coils to the end of reducing torque ripples (or cogging torque). See Japanese patent laid open publication No. 2002-272049A, for instance. In the slotless motor described in this prior patent publication, a flat conductor having a rectangular cross section is used instead of a more common conductor having a circular cross section to the end of maximizing the space factor. The flat wire is wound in a spiral path from the inner circumference to the outer circumference. On the other hand, Japanese patent laid open publication No. 2002-247791A discloses a coil winding method which is suitable for winding hexagonal coils for slotless motors having a core although hexagonal coils are typically used in coreless motors. In a hexagonal coil, each turn has an identical, substantially hexagonal shape, and is slightly shifted from the adjacent turn with a suitable amount of overlap along the circumferential direction (which is sometimes called as distributed winding) so that a coil having the shape of a thin cylindrical shell may be formed. Japanese patent laid open publication No. 2002-247791A also shows lozenge-shaped coils and honeycomb coils for use in coreless motors in addition to the hexagonal coil.

FIGS. 1 to 3 show the structure of a typical slotless permanent magnet generator. FIG. 1 is a schematic exploded perspective view of the slotless permanent magnet generator. FIG. 2 is a longitudinal schematic sectional view. FIG. 3 is a sectional view taken along line III-III of FIG. 2. As shown in these drawings, the slotless permanent magnet generator 1 comprises a substantially cylindrical shaft (rotor) 3 having a permanent magnet 2 incorporated therein, a stator core 4 surrounding the rotor 3 and a coil assembly 5 fixedly attached to the inner circumferential surface of the stator core 4 so as to define an air gap with respect to the outer circumferential surface of the rotor 3. The rotor 3 is rotatably supported by bearings not shown in the drawings, and an electric voltage is induced in the coil assembly 5 as the rotor 3 turns. The coil assembly 5 includes three independent coils so as to generate the voltage in three phases (U, V and W) which are electrically 120 degrees apart. Each coil has a plurality of turns which are each offset from the adjacent one in the direction of rotation so that the coil as a whole extends in the circumferential direction. In this example, each turn is lozenge-shaped. Such a slotless permanent magnet generator 1 is suited to be used as a small generator, but the rotor 3 is required to be rotated at high speed to obtain a large output.

FIG. 4a is a fragmentary enlarged view of FIG. 3, and shows that the coil wire of each coil consists of a conductor 10 having a square cross section. The conductor 10 is covered by electrically insulating material although it is not shown in the drawing. The conductor 10 is wound in two layers, an inner layer and an outer layer, in the cross sectional view of FIG. 4a but it only means that the coil is wound so that the adjacent turns overlap each other and the conductor for the coil of each phase consists of a single length of coil wire. In case of a two pole generator in which the permanent magnet 2 of the rotor 3 has only one N pole and one S pole, there may be two coils for each phase which are separated from each other by 180 degrees around the rotor 3, and connected to each other in series by a connecting wire. In any case, when each coil consists of a single conductor 10 having a square cross section, the copper loss can be reduced by increasing the cross sectional area of the conductor 10. However, when the cross sectional area of the conductor 10 is increased, the eddy current loss caused by the electric current that flows in the cross sectional plane in the manner of vortices rapidly increases with the increase in the rotational speed of the rotor 3 (typically to the 1.6 to 1.8th power of the rotational speed of the rotor 3) as shown in the graph of FIG. 4b. This seriously reduces the efficiency of the generator in a high speed range.

In general, the eddy current diminishes as the cross sectional area of the conductor 10 gets smaller. Therefore, it is conceivable to form the coil by using conductors 10a each having a smaller (for instance ¼), rectangular cross section as illustrated in FIG. 5a. In such a case, to minimize the increase in copper loss due to the reduction in the cross sectional area of the conductors 10a, it is common to form two coil segments for each phase and connect the two coil segments in parallel to each other. By so doing, the increase of the eddy current loss with the rise in the rotational speed of the rotor 3 can be controlled. However, as the rotational speed of the rotor 3 increases, a difference arises between the electromotive force between the two coil segments that are connected in parallel to each other, and the resulting circulating flow of electric current between the two coil segments gives rise to circulating current loss. This prevents the reduction in loss in a high speed range. If only one coil segment is used for each phase to avoid circulating current loss, the reduction in the cross sectional area of the conductor increases the copper loss to a significant extent.

It is known to wind a flat conductor having a rectangular cross section in an edgewise manner in choke coils or the likes (see Japanese patent laid open publication No. 2002-203438A). It is also known to use a Litz conductor having a flat rectangular cross section in induction heating coils (see Japanese patent laid open publication No. 2000-215972A).

BRIEF SUMMARY OF THE INVENTION

In view of such problems of the prior art, a primary object of the present invention is to provide rotary electric machinery which is both compact and efficient while capable of providing a large output.

A second object of the present invention is to provide slotless permanent magnet rotary electric machinery which can reduce loss in a high speed range to a significant extent without involving any significant increase in copper loss.

A third object of the present invention is to provide a method of making a coil for such slotless permanent magnet rotary electric machinery.

To achieve such objects, the present invention provides a slotless permanent magnet rotary electric machinery, comprising a substantially cylindrical rotor (53) incorporated with a permanent magnet (52), a stator iron core (54) surrounding the rotor; and a coil (55) provided between the rotor and stator core in a spaced relationship with respect to the rotor, characterized by that: the coil comprises a plurality of turns which are shifted from one turn to another along the circumferential direction in a mutually overlapping manner;

and the coil turns are formed by a conductor (60, 60a, 60b) having an elongated cross section, a long axis of the cross section extending in a radial direction. Thus, the copper loss due to the reduction in the cross sectional area of the conductor can be controlled while the eddy current loss in a high speed range is reduced so that a highly efficient slotless permanent magnet rotary electric machinery can be achieved.

According to a preferred embodiment of the present invention, the conductor is provided with a rectangular cross section having a longs side and short side, and the long side extends in a radial direction.

The conductor (60a) may consist of a Litz wire conductor. Thereby, the eddy current loss in a high speed range can be reduced even further.

The rectangular cross section of the conductor may be rounded at the four corners thereof. This is also effective in reducing the eddy current loss in a high speed range.

According to a certain aspect of the present invention, there is provided a method of making a coil (55) for a slotless permanent magnet rotary electric machinery (51), the coil including a plurality of turns of a flat conductor (60, 60a, 60b) having a rectangular cross section including a long side and short side, the turns being formed by winding the conductor in an edgewise fashion, comprising the steps of: wrapping a first wire (61) having a circular cross section of a substantially same diameter as the length of the short side of the flat conductor and a second wire (62) having a circular cross section of a larger diameter than the first wire around an elongated flat bar (63) in a spiral fashion in such a manner that the first and second wires alternate along the length of the flat bar while closely contacting each other as seen in a longitudinal sectional view of the flat bar; removing the first wire from the flat bar; wrapping the flat conductor around the flat bar along a space created by removing the first wire with the long side of the flat conductor oriented perpendicularly with respect to the axial line of the flat bar; and removing the second wire from the flat bar. This allows the flat conductor to be wound in an edgewise manner into a flat coil both easily and accurately. Therefore, when the coil is formed into a cylindrical shape and fitted into a slotless permanent magnet rotary electric machinery, the long side of the flat conductor can be oriented in the radial direction. Thereby, the copper loss can be controlled while the eddy current loss in a high speed range is reduced so that a highly efficient slotless permanent magnet rotary electric machinery can be achieved.

The coil may comprise a pair of coil segments adapted to be located 180 degrees apart in electric phase angle when installed in the slotless permanent magnet rotary electric machinery and a connecting wire connecting the coil segments to each other; and the two coil segments are formed by wrapping the flat conductor in mutually opposite directions in the step of wrapping the flat conductor around the flat bar. Thus, the voltages produced from the two coil sections are given with a same phase relationship so that the connecting wire is only required to connect the adjacent ends of the two coil sections, and can be thereby minimized in length.

The conductor may consist of a Litz wire conductor. This allows the eddy current loss in a high speed range to be reduced even further.

Preferably, the method further includes the step of deforming the coil so that each turn is given with a circular or polygonal shape following the step of removing the second wire from the flat bar. Each turn may have a lozenge-shape. According to an embodiment of the present invention, the step of deforming the coil comprises the steps of: removing the flat conductor from the flat bar, and fitting the coil onto a second flat bar (69) having a smaller width than the first flat bar; placing a first pressure member (70) and a second pressure member (71) having mutually opposing ends of prescribed complementary shapes opposite to the corresponding opposite ends of the coil; and moving the first and second pressure members toward each other along the surface of the second flat bar so as to pressurize the coil from the both ends with the first and second pressure members.

The features, objects and advantages of the present invention will become apparent by referring to the following description in conjunction with the appended drawings.

BRIEF DESCRIPTION OF THE DRAWINGS

Now the present invention is described in the following with reference to the appended drawings, in which:

FIG. 4b is a graph showing the relationship between the rotational speed of the rotor and loss in the conventional slotless permanent magnet rotary electric generator having the coil as illustrated in FIG. 4a;

FIG. 5b is a graph showing the relationship between the rotational speed of the rotor and loss in the conventional slotless permanent magnet rotary electric generator having the coil as illustrated in FIG. 5a;

FIG. 7b is a graph showing the relationship between the rotational speed of the rotor and loss in the slotless permanent magnet rotary electric generator having the coil as illustrated in FIG. 7a;

FIG. 8b is a graph showing the relationship between the rotational speed of the rotor and loss in the slotless permanent magnet rotary electric generator having the coil as illustrated in FIG. 8a;

FIG. 9b is a graph showing the relationship between the rotational speed of the rotor and loss in the slotless permanent magnet rotary electric generator having the coil as illustrated in FIG. 9a;

DETAILED DESCRIPTION OF THE PREFERRED EMBODIMENTS

Figure 1:
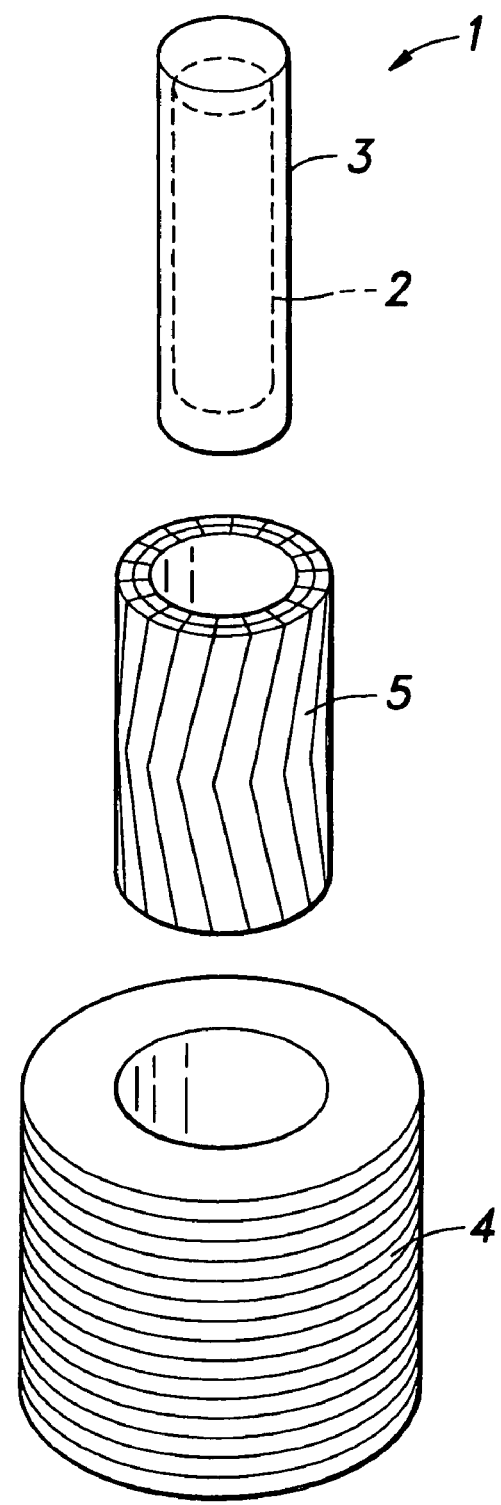
FIG. 1 is an exploded perspective view showing a conventional slotless permanent magnet rotary electric generator.
Figure 2:
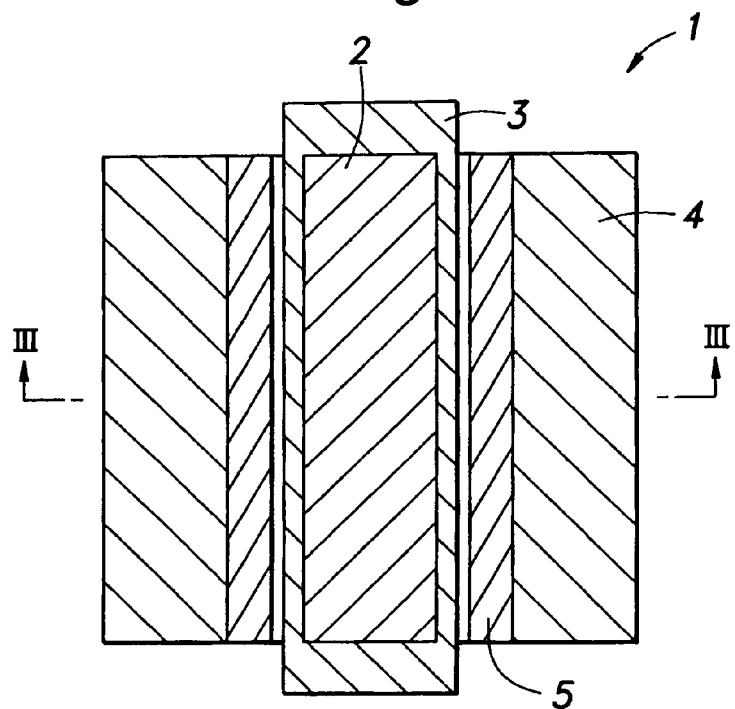
FIG. 2 is a longitudinal sectional view of the conventional slotless permanent magnet rotary electric generator of FIG. 1.
Figure 3:
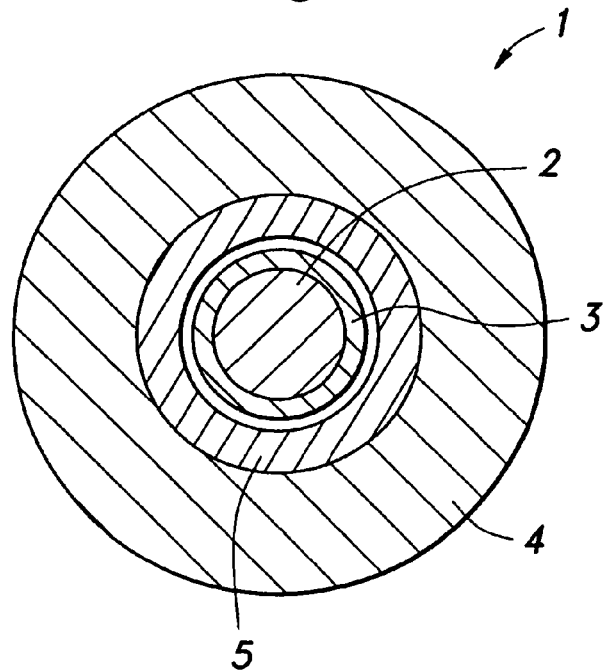
FIG. 3 is a sectional view taken long line III-III of FIG. 2.
Figure 4A:
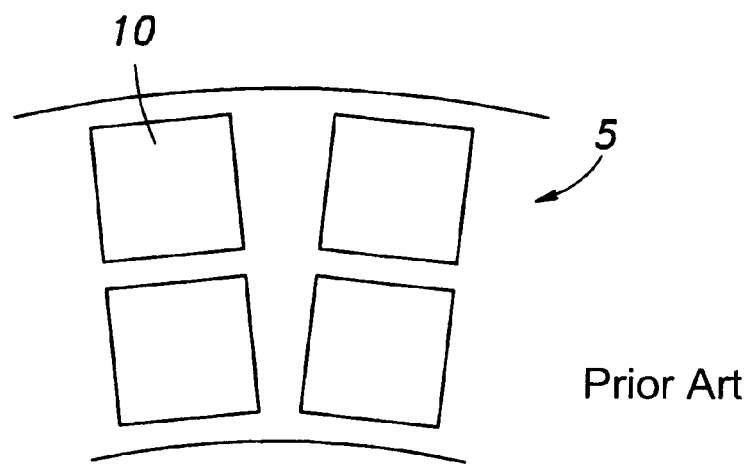
FIG. 4a is a fragmentary enlarged view of an exemplary coil for the conventional slotless permanent magnet rotary electric generator of FIG. 1.
Figure 5A:
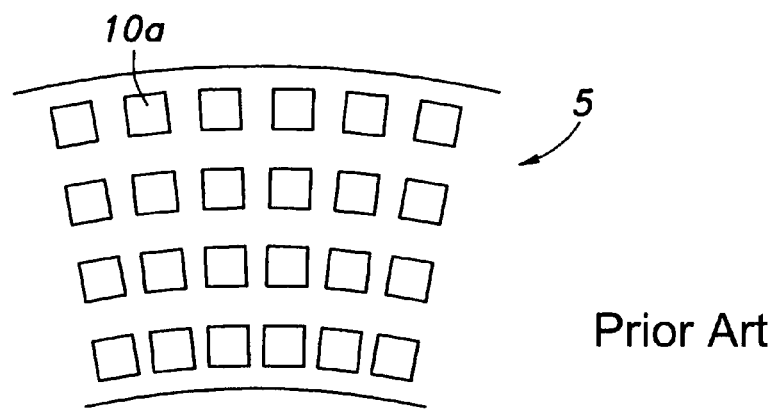
FIG. 5a is a fragmentary enlarged view of another exemplary coil for the conventional slotless permanent magnet rotary electric generator of FIG. 1.
Figure 5B:
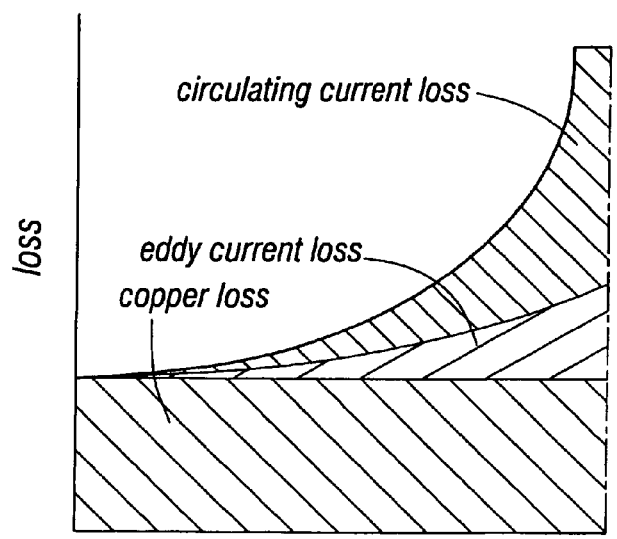
Figure 6:
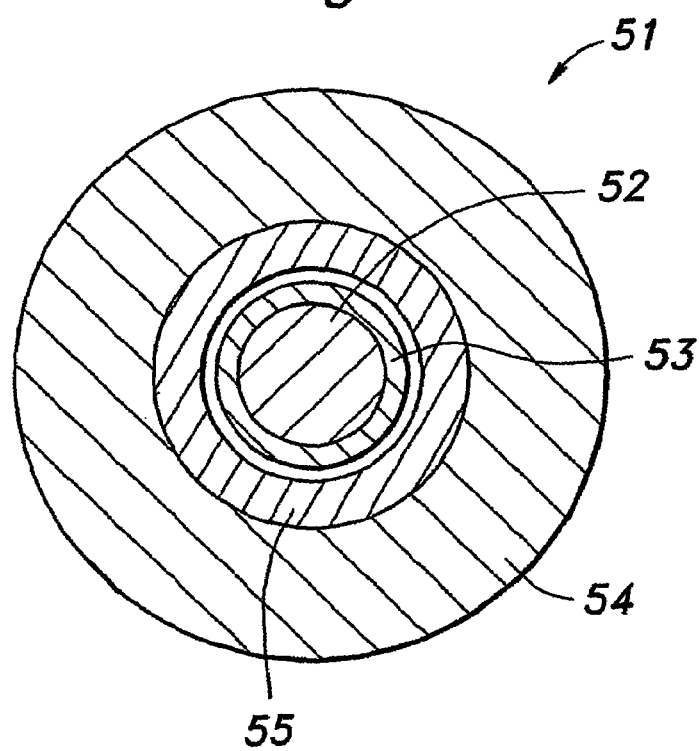
FIG. 6 is a sectional view similar to FIG. 3 showing a slotless permanent magnet rotary electric generator embodying the present invention.

FIG. 6 is a sectional view similar to FIG. 3 showing a slotless permanent magnet generator embodying the present invention. Similarly as the conventional slotless permanent magnet generator 1 shown in FIGS. 3 to 5, this slotless permanent magnet generator 51 comprises a substantially cylindrical rotor 53 incorporated with a permanent magnet 52, a stator iron core 54 surrounding the rotor 53 and a coil 55 attached to the inner circumferential surface of the stator iron core 54 so as to define an air gap in relation with the outer circumferential surface of the rotor 53. However, the cross sectional shape of the conductor 60 forming the coil 55 is different from that of the conventional conductor.

Figure 7A:
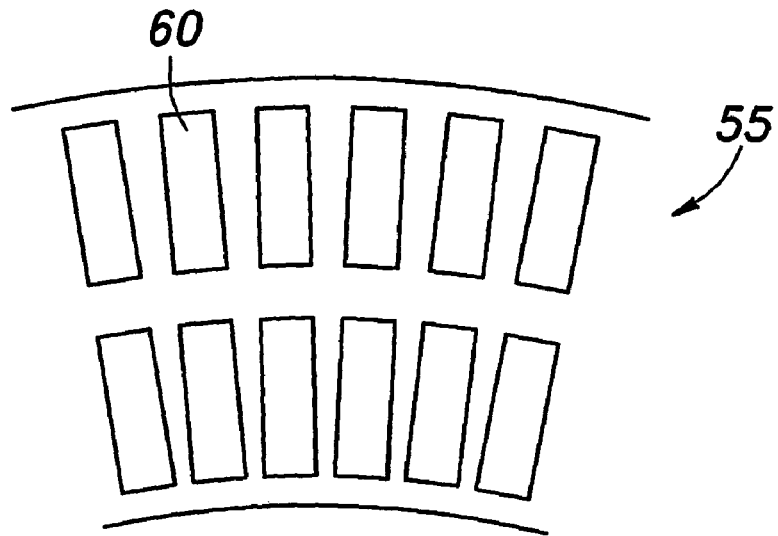
FIG. 7a is a fragmentary enlarged view of a preferred coil for the slotless permanent magnet rotary electric generator according to the present invention.

Referring to FIG. 7a, the conductor 60 of the slotless permanent magnet generator 51 is provided with an elongated cross section or more particularly a flat rectangular cross section having a long side and a short side. For instance, the longs side of the conductor 60 shown in FIG. 7a may be identical to the side of the square cross section of the conductor 10 shown in FIG. 4a while the short side may be one third of the side of the square cross section. As shown in FIG. 7a, the conductor 60 is disposed in such a manner that the long side thereof extends along the radial direction of the rotor 53.

Figure 7B:
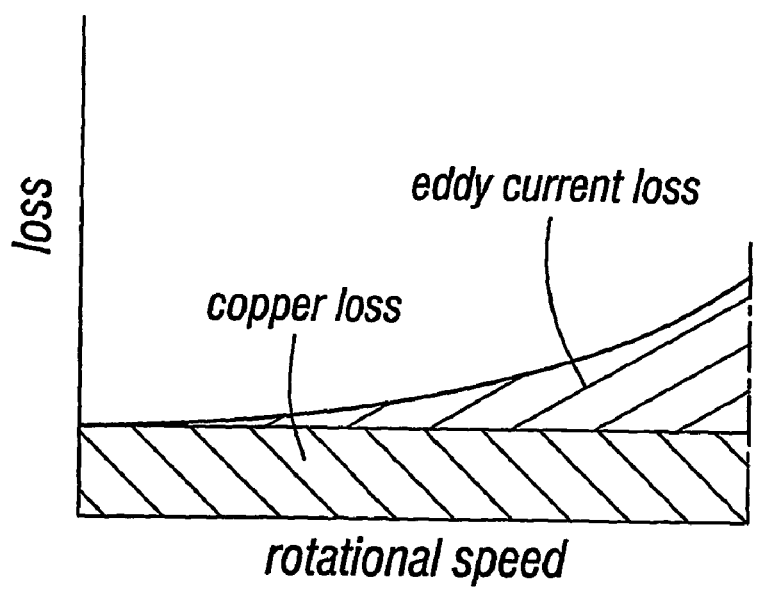

FIG. 7b is a graph showing the relationship between the rotational speed of the rotor 53 and the loss in the coil 55 in the embodiment illustrated in FIG. 7a. As demonstrated by this graph, the use of the conductor 60 as shown in FIG. 7a allows the increase in the eddy current loss in a high speed range of the rotor 53 to be minimized while controlling the increase in the copper loss. In other words, for a given cross sectional area of the conductor 60, the use of the conductor 60 having an elongated rectangular cross section and orienting the long side in the radial direction reduces the eddy current loss to a significant extent while the copper loss remains the same.

Figure 8A:
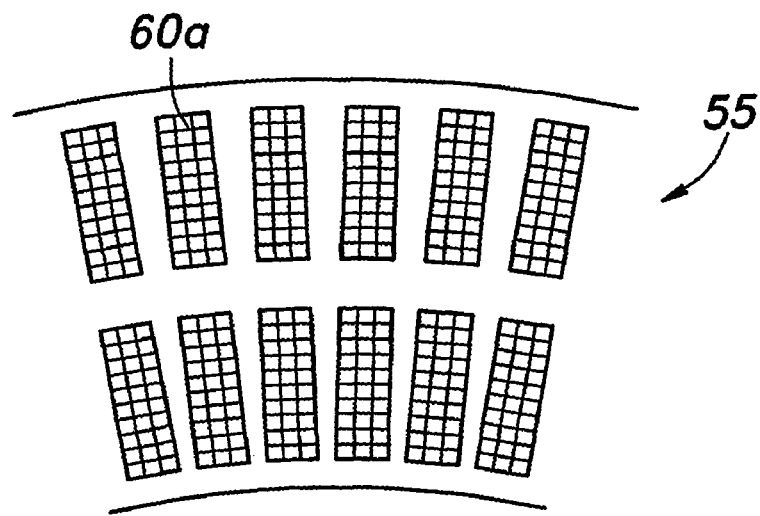
FIG. 8a is a fragmentary enlarged view of another preferred coil for the slotless permanent magnet rotary electric generator according to the present invention.
Figure 8B:
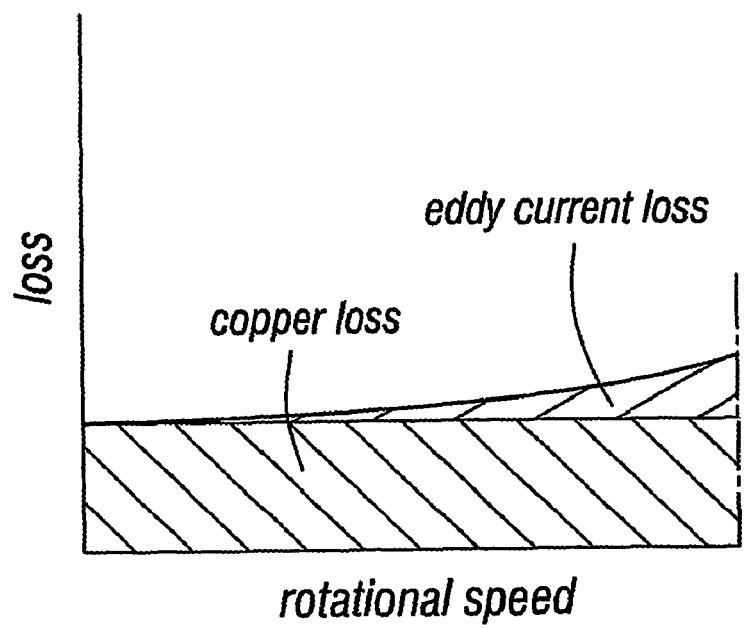

FIG. 8a is a fragmentary enlarged sectional view similar to FIG. 7a showing another embodiment of the present invention, and FIG. 8b is a graph showing the relationship between the rotational speed of the rotor 53 and the loss in the embodiment illustrated in FIG. 8a. Similarly as the conductor 60 of FIG. 7a, the conductor 60a for the coil shown in FIG. 8a is provided with an elongated rectangular cross section, and its long side is oriented in the radial direction. However, the conductor 60a of FIG. 8a differs in that it consists of a Litz wire conductor. A Litz wire conductor is formed by twisting a large number of mutually insulated wires, and is well known in the art. Owing to the thickness of the insulating film on each individual wire in case of a Litz wire conductor, the cross sectional area of the conductor 60a may be somewhat smaller than that of the conductor 60 shown in FIG. 7a so that the copper loss increases as shown in the graph of FIG. 8b. However, the eddy current loss can be more effectively controlled. Therefore, the embodiment of FIG. 8a is more suitable for high speed applications than the embodiment shown in FIG. 7a.

Figure 9A:
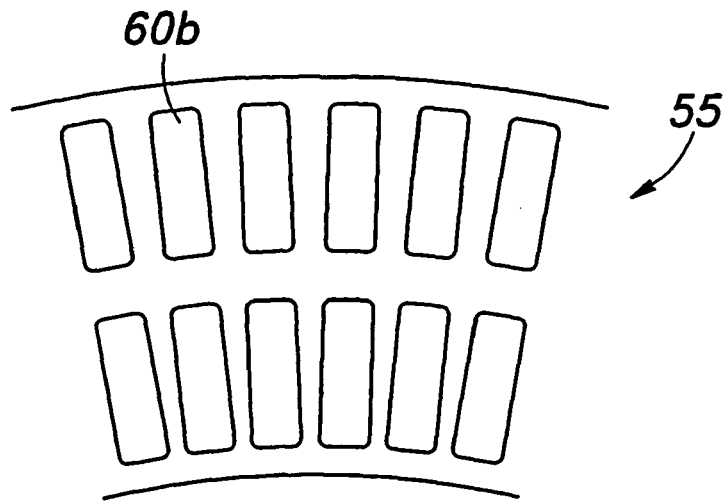
FIG. 9a is a fragmentary enlarged view of yet another preferred coil for the slotless permanent magnet rotary electric generator according to the present invention.
Figure 9B:
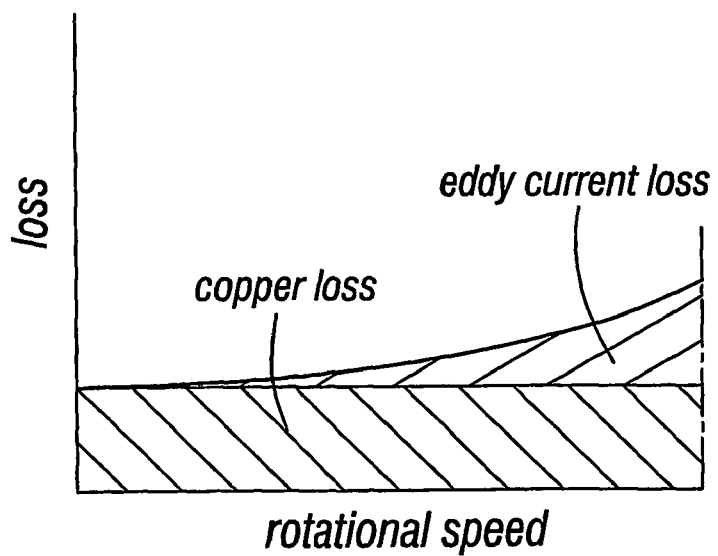

When the conductor forming the coil has a rectangular cross section, eddy current tends to concentrate in the corners. FIG. 9a is a fragmentary enlarged sectional view similar to FIG. 7a showing another modified embodiment of the present invention which can more effectively reduce eddy current by taking advantage of such a property of eddy current. In the embodiment illustrated in FIG. 9a, the conductor 60b has a rectangular cross section having rounded corners. In this embodiment, as shown in the graph of FIG. 9b, the eddy current loss in a high speed range of the rotor 53 can be more effectively controlled as compared with the embodiment illustrated in FIG. 7b. Because the cross sectional shape of the conductor 60b of the embodiment illustrated in FIG. 9a is rounded at the corners, the cross sectional area may be reduced from that of the embodiment shown in FIG. 7a and the copper loss therefore becomes somewhat greater. Generally speaking, the more rounded the cross sectional shape is, the more reduced the eddy current loss becomes and the more increased the copper loss becomes.

Figure 4B:
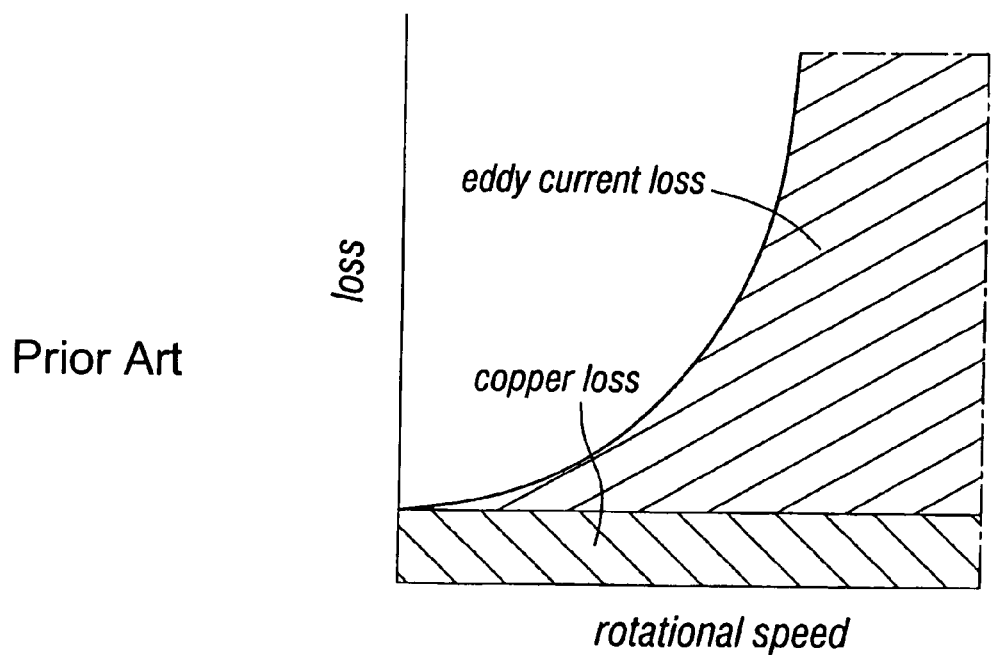
Figure 10:
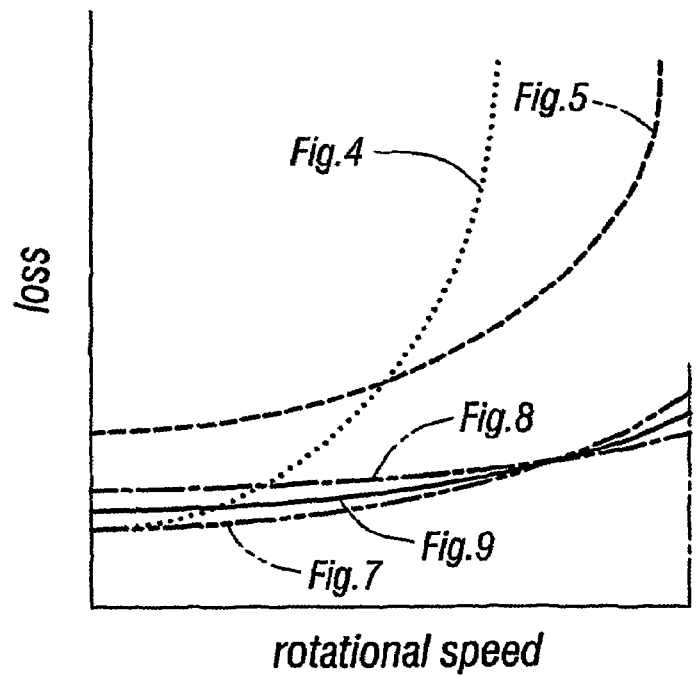
FIG. 10 is a graph showing the relationship between the rotational speed of the rotor and loss in the slotless permanent magnet rotary electric generators according to the present invention and the prior art.

FIG. 10 shows the relationship between the rotational speed of the rotor 53 and 3 and the loss in the cases of the embodiments of the present invention (FIGS. 7 to 9) and the conventional examples (FIGS. 4 and 5). As shown in the drawing, the embodiments of the present invention allow the loss (eddy current loss) to be significantly reduced in a high speed range while controlling any substantial increase in the loss (copper loss) in a low speed range.

Referring to FIGS. 11 to 21, a preferred method of fabricating the coil assembly 55 of the slotless permanent magnet generator 51 is now described in the following. In each of FIGS. 11 to 14, a represents a plan view while b represents a fragmentary longitudinal sectional view.

Figure 11A:
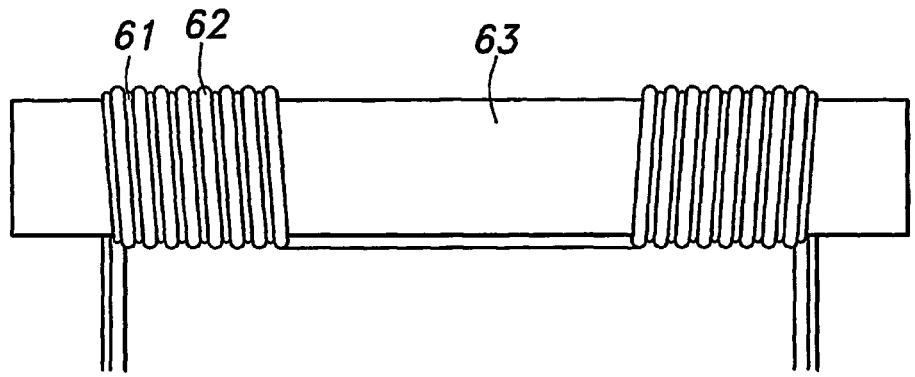
FIG. 11a is a plan view showing a step in the method of making a preferred coil for the slotless permanent magnet rotary electric generators according to the present invention.
Figure 11B:
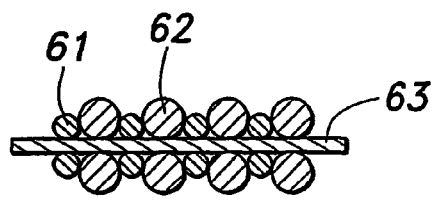
FIG. 11b is a fragmentary longitudinal sectional view showing the same step.

Referring to FIG. 11a, a first wire 61 having a circular cross section of a substantially same diameter as the length of the short side of the rectangular flat conductor 60 (60a, 60b) which finally forms the coil 55 and a second wire 62 having a circular cross section of a larger diameter than the first wire 61 are wrapped around an elongated flat bar 63 in a spiral fashion in such a manner that the first and second wires 61 and 62 alternate along the length of the flat bar while closely contacting each other as seen in a longitudinal sectional view of the flat bar as shown in FIG. 11b. For instance, the cross sectional dimensions of the conductor 60 are 0.2 mm×0.6 mm (an aspect ratio of 1 to 3), and the diameter of the first circular wire 61 is 0.3 mm while that of the second circular wire 62 is 0.5 mm. In the illustrated embodiment, the first and second coil wires 61 and 62 are wrapped around the flat bar 63 at two axial positions to form a pair of coil sections (see FIG. 15) for each phase so that each phase is represented by a pair of coil sections 65 and 66 which are connected to each other by a connecting wire 67 (see FIG. 15). These coil sections 65 and 66 will be separated by 180 degrees in terms of the electric angle when they are installed in the slotless permanent magnet generator 51.

Figure 12A:
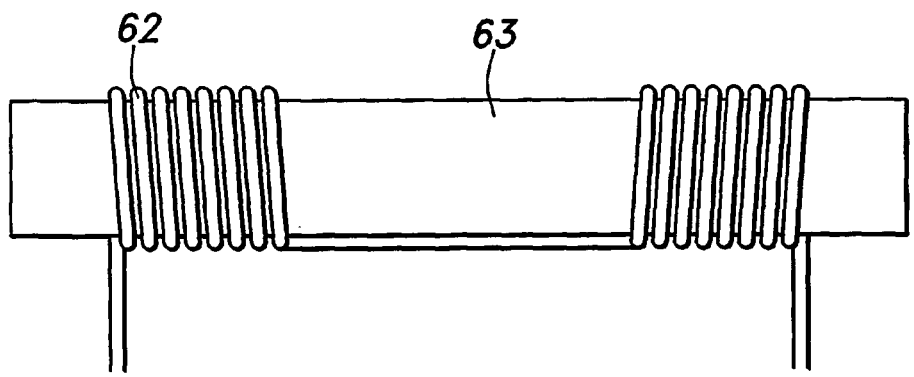
FIG. 12a is a plan view showing a step in the method of making a preferred coil for the slotless permanent magnet rotary electric generators according to the present invention.
Figure 12B:
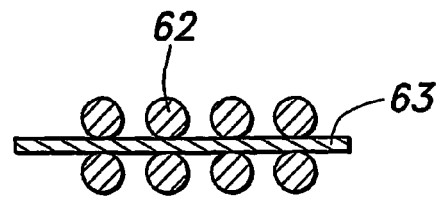
FIG. 12b is a fragmentary longitudinal sectional view showing the same step.

Then, as shown in FIG. 12, only the first coil wire 61 is removed from the flat bar 63.

Figure 13A:
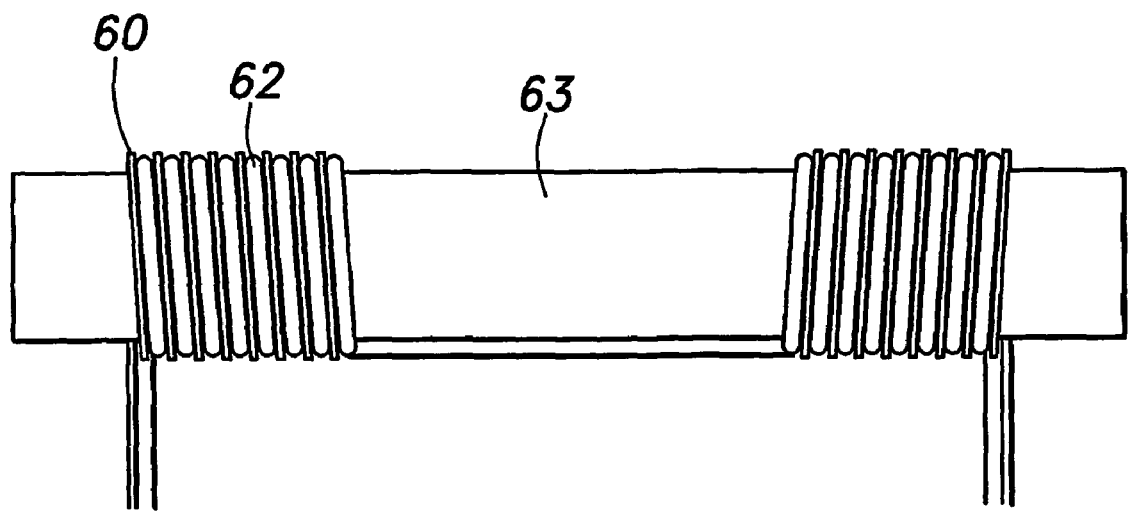
FIG. 13a is a plan view showing a step in the method of making a preferred coil for the slotless permanent magnet rotary electric generators according to the present invention.
Figure 13B:
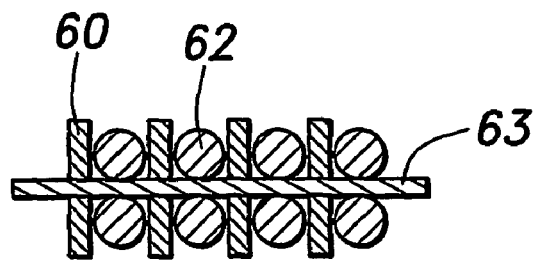
FIG. 13b is a fragmentary longitudinal sectional view of the same step.

Referring to FIG. 13, a conductor 60 having a rectangular cross section is wrapped around the flat bar 63 along the gap created by removing the first circular wire 61 with the long side of the cross section of the conductor 60 extending substantially perpendicularly to the axial line of the flat bar 63 (edgewise winding).

Figure 14A:
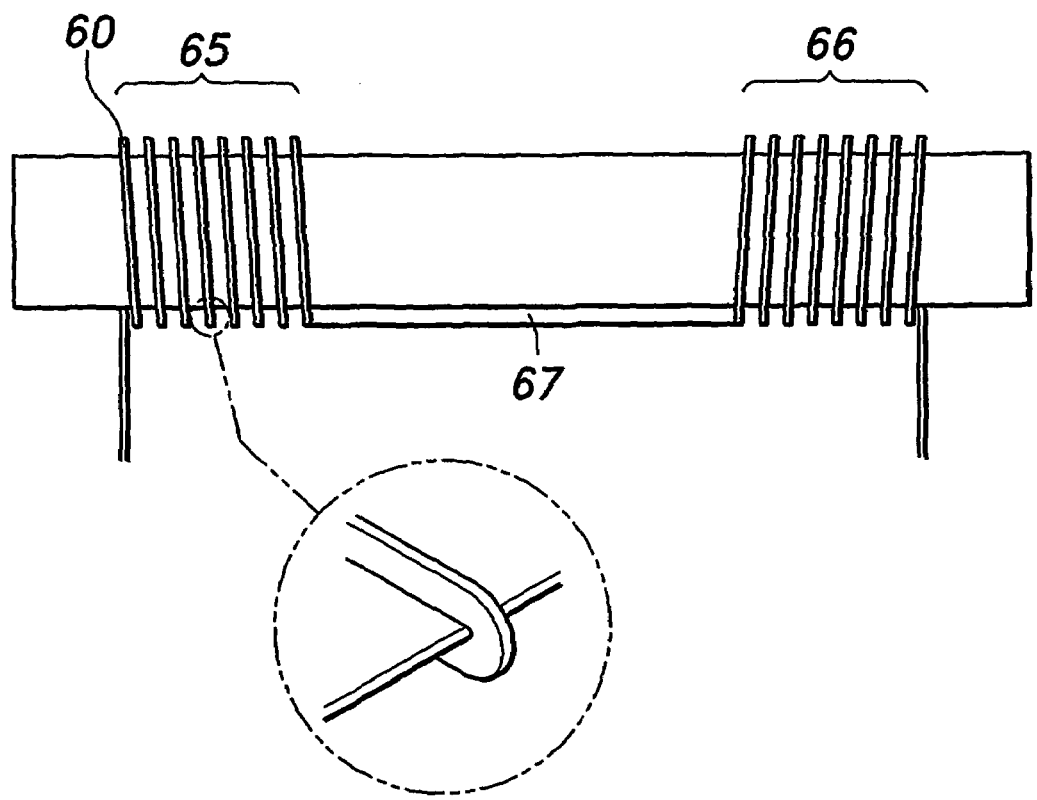
FIG. 14a is a plan view showing a step in the method of making a preferred coil for the slotless permanent magnet rotary electric generators according to the present invention.
Figure 14B:
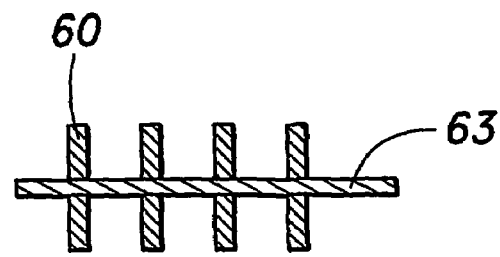
FIG. 14b is a fragmentary longitudinal sectional view showing the same step.

After the conductor 60 has been wound around the flat bar 63 in an edgewise fashion, the second circular wire 62 is removed from the flat bar 63. In this fashion, the conductor 60 having a rectangular cross section can be wound in an edgewise fashion while controlling the space between the adjacent turns of the conductor 60 as shown in FIG. 14.

Figure 15A:
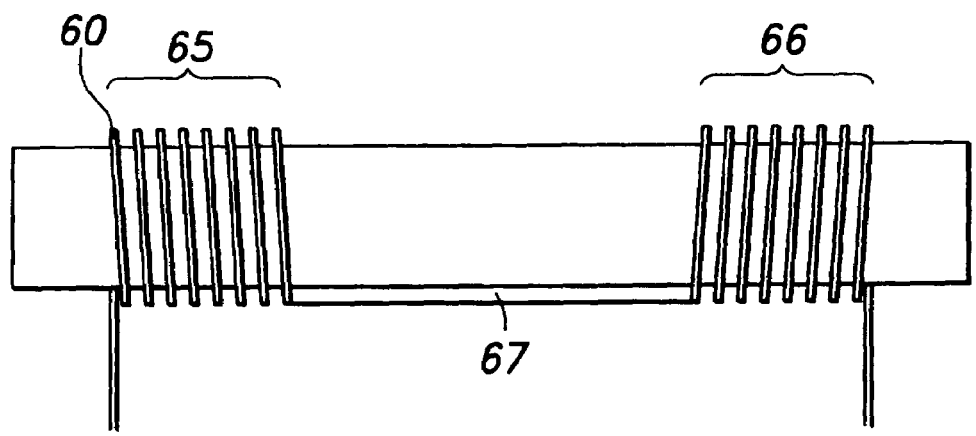
FIG. 15a is a plan view showing a preferred coil for a slotless permanent magnet electric generator according to the present invention.
Figure 15B:
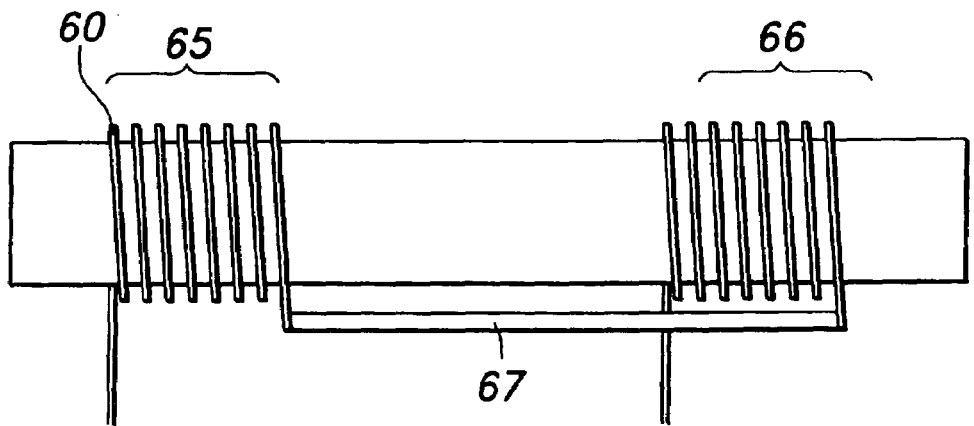
FIG. 15b is a plan view showing a conventional arrangement.

When winding the conductor 60 around the flat bar 63 in an edgewise fashion, the winding direction may be reversed between the two coil sections 65 and 66 as shown in FIG. 15a. For instance, the coil section 65 is wound in clockwise direction while the coil section 66 is wound in counterclockwise direction. If the conductor 60 is wound in the same direction for both the coil sections 65 and 66 (both in clockwise direction, for instance) as shown in FIG. 15b, these coil sections produce voltages of opposite phases that are 180 degrees apart. Therefore, one end of one of the coil sections is required to be connected to the remote end of the other coil section via the connecting wire 67 so that the connecting wire 67 becomes relatively long. On the other hand, if the conductor 60 is wound in opposite directions in the two coil sections 65 and 66, the two coil sections produce voltages of the same phase so that the connecting wire is only required to connect the two adjacent terminals of the coil sections 65 and 66. Therefore, the length of the connecting wire 67 can be minimized.

Figure 16:
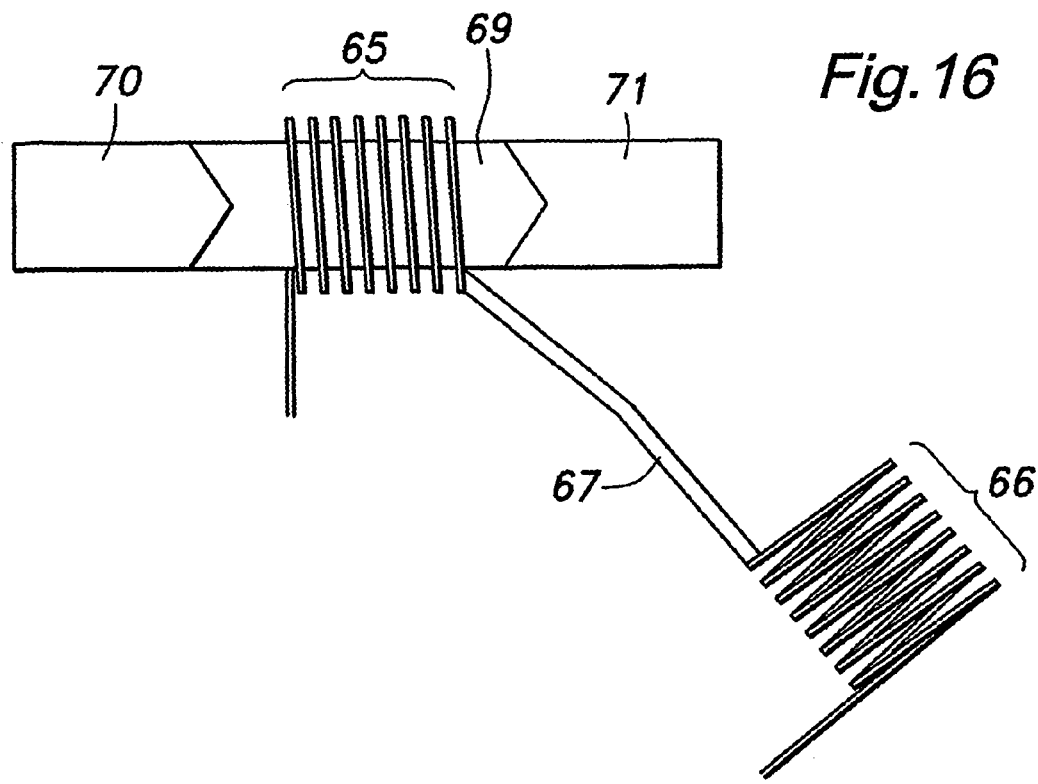
FIG. 16 is a plan view showing a step of a preferred method of making a coil for the slotless permanent magnet rotary electric generator according to the present invention.

Referring to FIG. 16, the conductor 60 is removed from the flat bar 63, and one of the coil sections (coil section 65, for instance) is fitted onto a second flat bar 69 having a smaller width than the first flat bar 63. A V-plate 70 having an end portion shaped like letter V and an M-plate 71 having an end portion shaped like letter M are slidably placed on the second flat bar 69 with these end portions opposing each other. The coil section 65 is placed between the V-plate 70 and M-plate 71.

Figure 17:
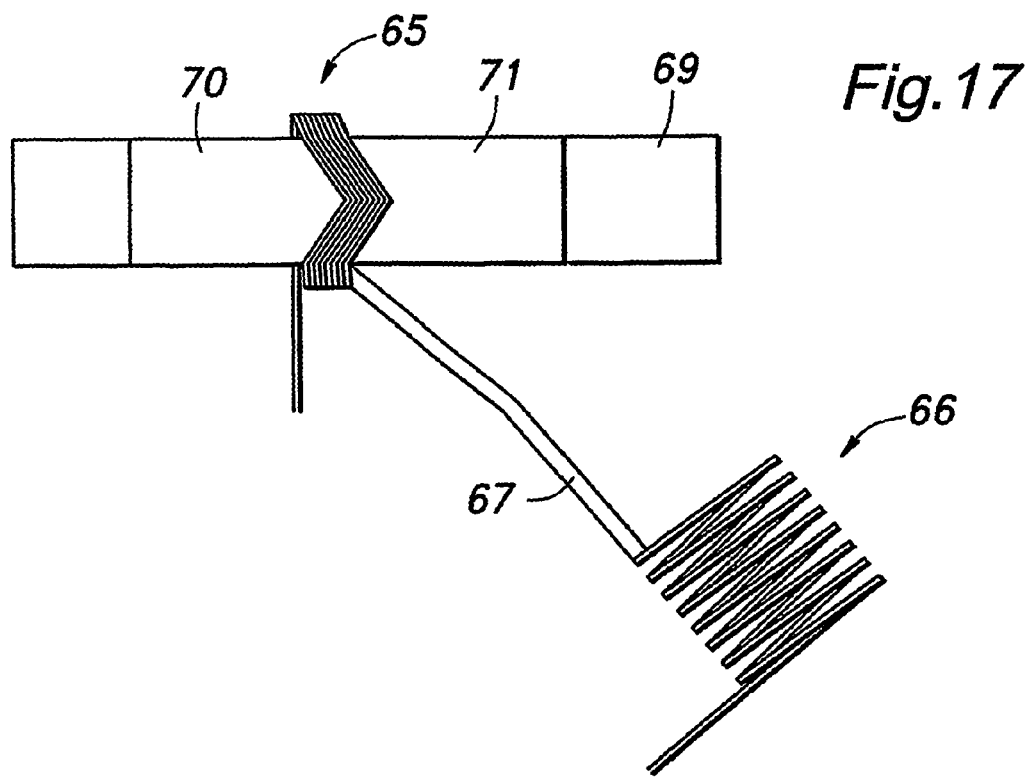
FIG. 17 is a plan view showing a step of the preferred method of making a coil for the slotless permanent magnet rotary electric generator according to the present invention.

By moving the V-plate 70 and M-plate 71 toward each other, the coil section 65 is compressed between the two plates as shown in FIG. 17, and the turns of the coil section 65 located on the front surface of the second flat bar 69 can be deformed into the shape of letter V. Although not shown in the drawing, a similar V-plate and M-plate are placed on the reverse surface of the second flat bar 69 in an opposite arrangement in relation with those on the front surface of the second flat bar 69. Therefore, the coil turns are similarly deformed on the reverse surface of the second flat bar 69. Alternatively, after the coil turns of the coil section 65 on the front surface of the second flat bar 69 are deformed into the shape of letter V, the V-plate and M-plate may be removed from the second flat bar 69 to be mounted on the reverse surface of the second flat bar 69 and deform the coil turns on the reverse surface of the second flat bar 69. The other coil section 66 may also be deformed in a similar fashion.

Thus, when the coil sections 65 and 66 are removed from the second flat bar 69, the resulting coil 73 comprises a pair of coil sections 65 and 66 each consisting of a plurality of lozenge shaped turns which are arranged along the lengthwise direction with a certain overlap, and is generally planar in shape.

Figure 18:
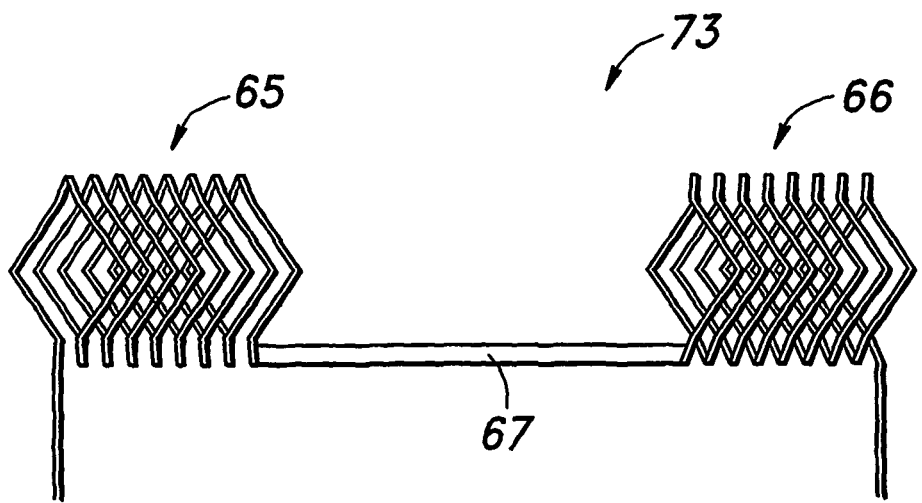
FIG. 18 is a plan view showing a step of the preferred method of making a coil for the slotless permanent magnet rotary electric generator according to the present invention.
Figure 20:
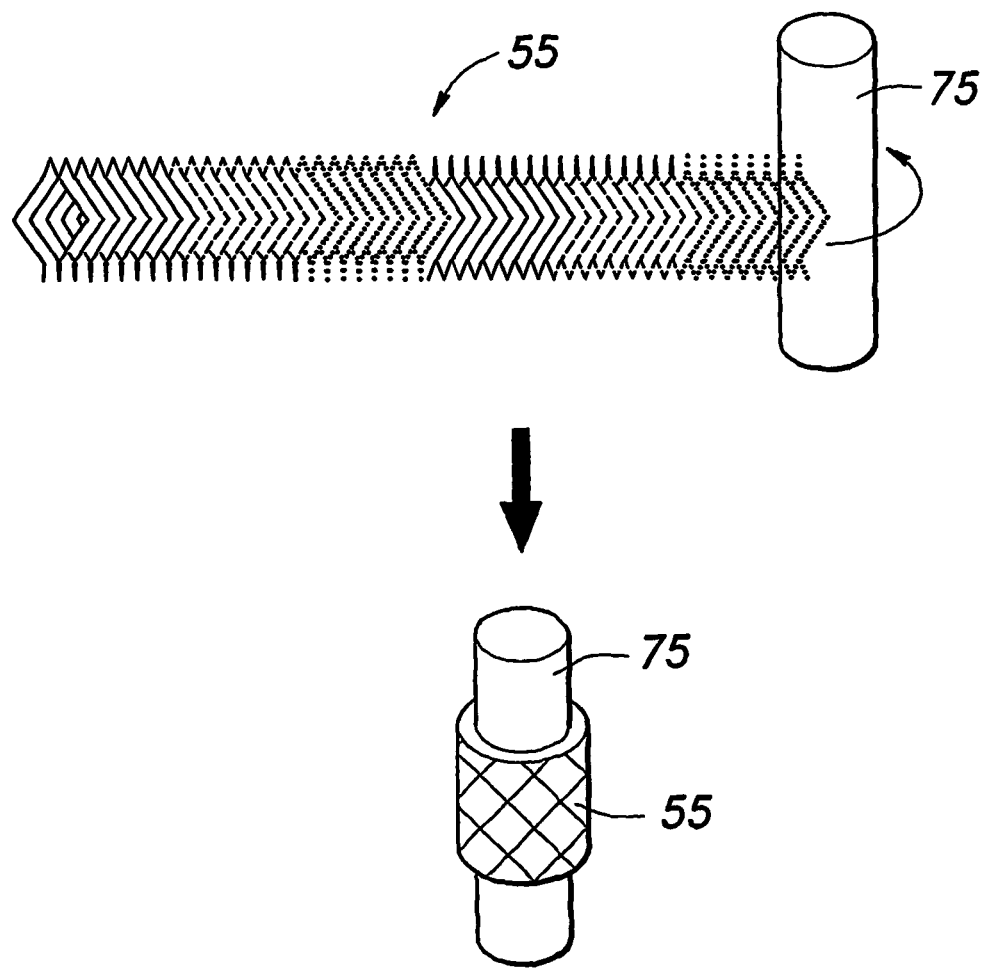
FIG. 20 is a plan view showing a step of the preferred method of making a coil for the slotless permanent magnet rotary electric generator according to the present invention.
Figure 19:
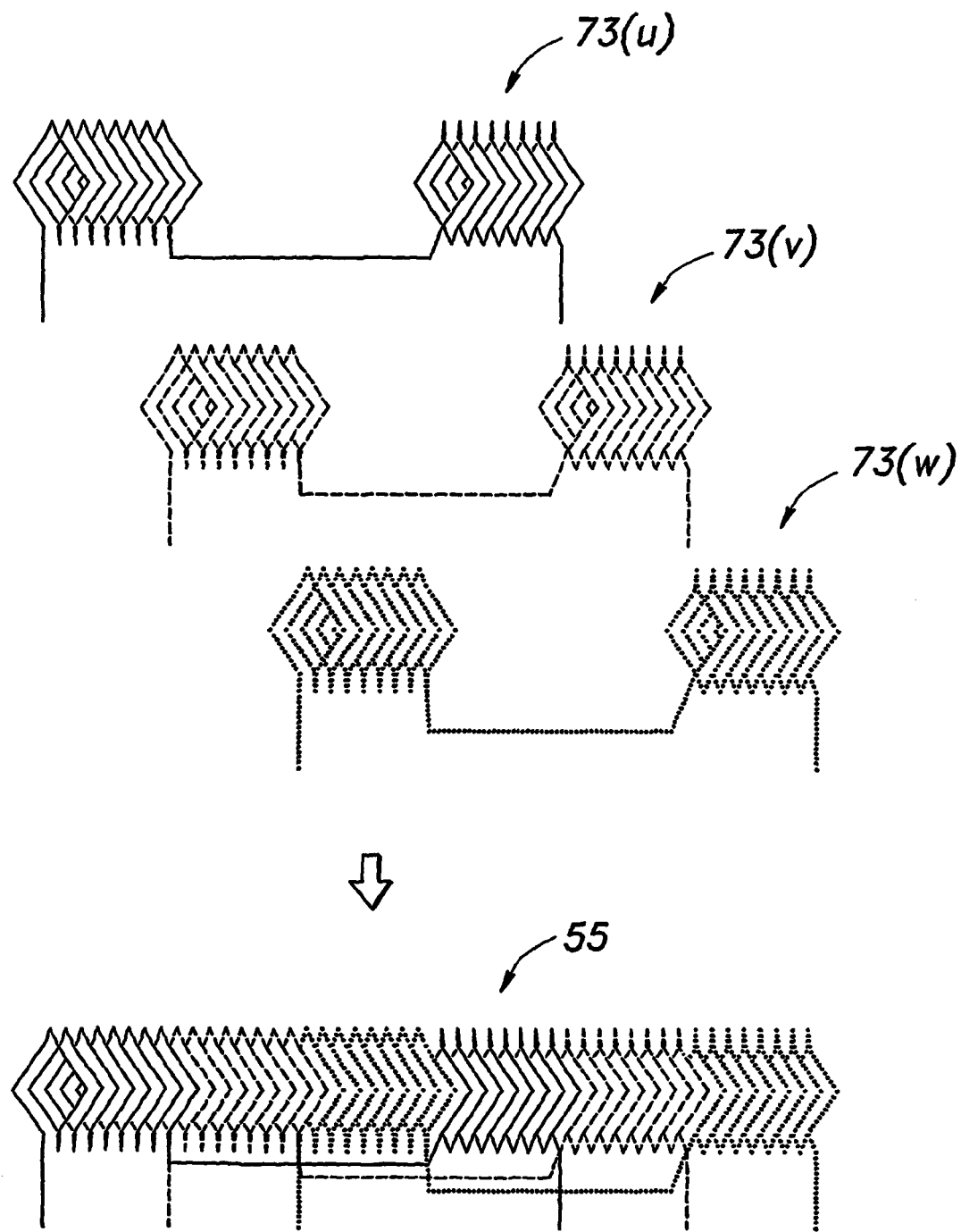
FIG. 19 is a plan view showing a step of the preferred method of making a coil for the slotless permanent magnet rotary electric generator according to the present invention.

The coil assembly 55 is formed by preparing coils 73 for the three phases as illustrated in FIG. 18, and laying them out with some overlap between them as illustrated in FIG. 19. The coil assembly 55 is then wrapped around a shaft 75 as illustrated in FIG. 20, and is thereby formed into a cylindrical shape. In this process, it is preferable to wrap polyimide tape or the like around the shaft 75 to protect the coil assembly 55. As it is difficult to form the coil assembly into the desired cylindrical shape, it is preferable to prepare a plurality of shafts 75 having different diameters and to wrap the coil assembly 55 around one cylinder to another having a progressively smaller diameter so as to reduce the diameter of the coil assembly 55 in a progressive manner.

Figure 21:
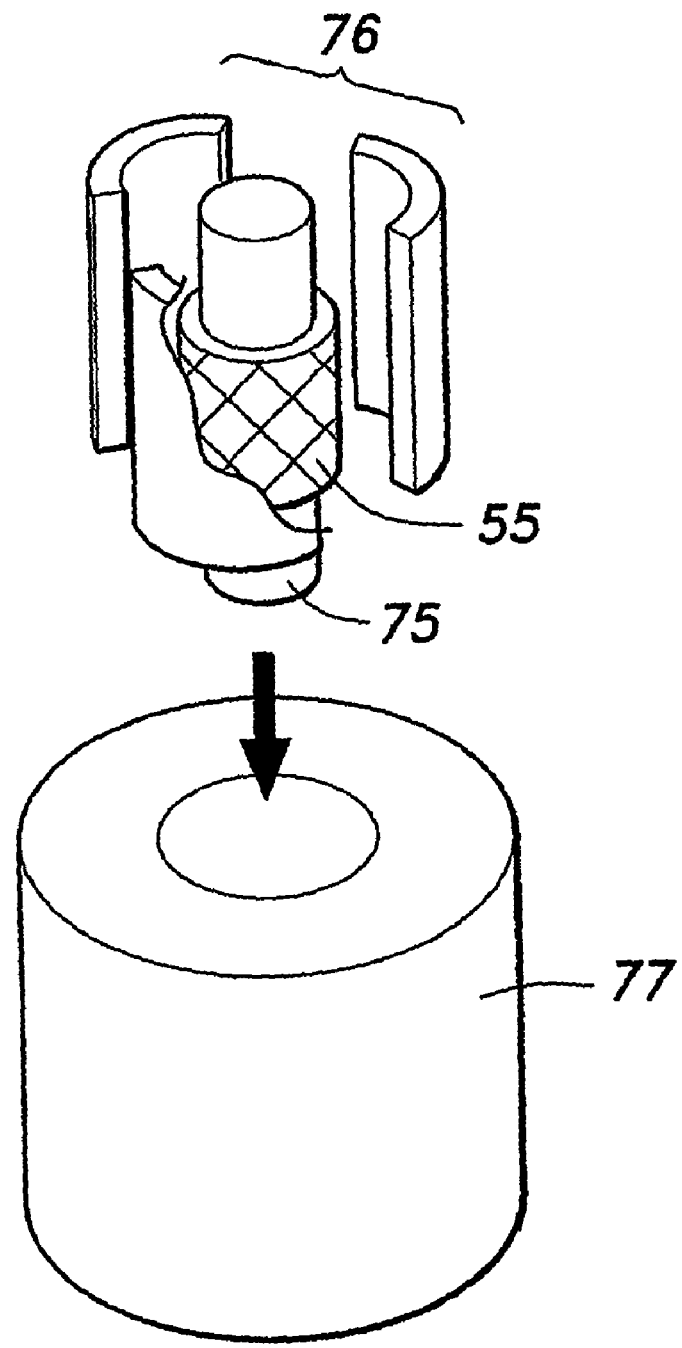
FIG. 21 is a plan view showing a step of the preferred method of making a coil for the slotless permanent magnet rotary electric generator according to the present invention.

When the diameter of the coil assembly 55 has been reduced to a certain level, the diameter is reduced to the final value by compressing the coil assembly 55 from outside. As illustrated in FIG. 21, this can be accomplished by wrapping copper foil tape and polyimide tape around the coil assembly 55 for the protection of the coil assembly 55, applying a first cylindrical jig 76 consisting of three pieces around the coil assembly 55 and forcing this assembly into a second cylindrical jig 77 having an inner diameter which is substantially the same as or slightly small than the outer diameter of the first cylindrical jig 76. Optionally, a plurality of first jigs 76 having different inner diameters may be used one after another in the order of their inner diameters from greater to smaller. This completes the coil assembly 55.

Figure 22:
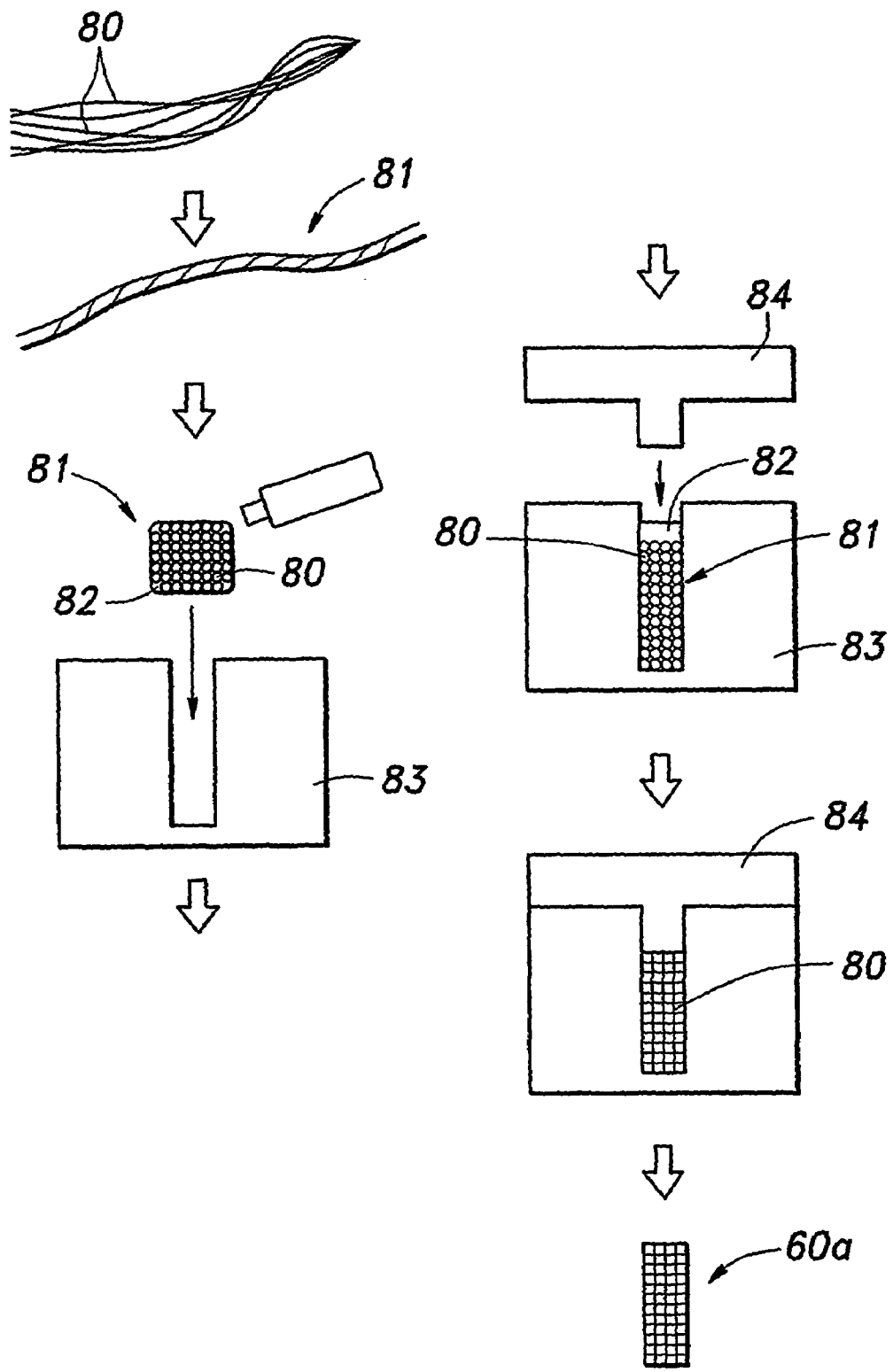
FIG. 22 is a diagram showing a preferred method for making a conductor having a rectangular cross section.

FIG. 22 shows a preferred method for making a Litz wire conductor 60a having a rectangular cross section as shown in FIG. 8. As shown in the upper left part of FIG. 22, a plurality of fine wires 80 such as enamel wires having a circular cross section are twisted with each other so as to form a Litz wire 81. As shown in the lower left part of FIG. 22, a plurality of such Litz wires 81 are impregnated with a bonding agent 82 of such material as polyimide, epoxy or the like, and pushed into a concave metallic mold 83. As shown in the upper right part of FIG. 22, a convex metallic mold 84 is forced into the concave metallic mold 83 to apply pressure to the Litz wires 81 impregnated with the bonding agent 82. Prior to the application of pressure by the convex metallic mold 84, each of the fine wires 80 forming the Litz wire 81 has a circular cross section. However, once the pressure is applied to it by the convex metallic mold 84, each of the fine wires 80 deforms into a rectangular shape and the conductor 60*a* having a rectangular cross section is achieved at the same time as shown in the lower right part of FIG. 22.

As can be appreciated from the foregoing description, the present invention provides a slotless permanent magnet rotary electric machinery which is made highly efficient by forming the coil with a conductor having a rectangular cross section and orienting the long side of the conductor in the radial direction and thereby avoiding an undue increase in copper loss and significantly reducing eddy current loss in a high speed range.

Although the present invention has been described in terms of preferred embodiments thereof, it is obvious to a person skilled in the art that various alterations and modifications are possible without departing from the scope of the present invention which is set forth in the appended claims. For instance, although the present invention was described in terms of electric generators, the present invention can also be implemented as electric motors. Each turn of the coil is not necessarily required to be lozenge-shaped, but may also be hexagonal or other polygonal shape or circular.

The invention claimed is:

1. A method of making a coil for a slotless permanent magnet rotary electric machinery, the coil including a plurality of turns of a flat conductor having a rectangular cross section including a long side and short side, the turns being formed by winding the conductor in an edgewise fashion, comprising the steps of:

wrapping a first wire having a circular cross section of a substantially same diameter as the length of the short side of the flat conductor and a second wire having a circular cross section of a larger diameter than the first wire around an elongated flat bar in a spiral fashion in such a manner that the first and second wires alternate along the length of the flat bar while closely contacting each other as seen in a longitudinal sectional view of the flat bar;

removing the first wire from the flat bar;

wrapping the flat conductor around the flat bar along a space created by removing the first wire with the long side of the flat conductor oriented perpendicularly with respect to the axial line of the flat bar; and removing the second wire from the flat bar.

2. The method of making a coil according to claim 1, wherein the coil comprises a pair of coil segments adapted to be located 180 degrees apart in electric phase angle when installed in the slotless permanent magnet rotary electric machinery and a connecting wire connecting the coil segments to each other; and the two coil segments are formed by wrapping the flat conductor in mutually opposite directions in the step of wrapping the flat conductor around the flat bar.

3. The method of making a coil according to claim 1, wherein the conductor consists of a Litz wire conductor.

4. The method of making a coil according to claim 1, further comprising the step of deforming the coil so that each turn is given with a circular or polygonal shape following the step of removing the second wire from the flat bar.

5. The method of making a coil according to claim 4, wherein the step of deforming the coil comprises the steps of:

removing the flat conductor from the flat bar, and fitting the coil onto a second flat bar having a smaller width than the first flat bar;

placing a first pressure member and a second pressure member having mutually opposing ends of prescribed complementary shapes opposite to the corresponding opposite ends of the coil; and moving the first and second pressure members toward each other along the surface of the second flat bar so as to pressurize the coil from the both ends with the first and second pressure members.

* * * * *